D. S. KOHL.
CULTIVATOR MECHANISM.
APPLICATION FILED JUNE 15, 1920.

1,360,649.

Patented Nov. 30, 1920.

Inventor
Daniel S. Kohl

UNITED STATES PATENT OFFICE.

DANIEL S. KOHL, OF JARED, WASHINGTON.

CULTIVATOR MECHANISM.

1,360,649.  Specification of Letters Patent.  Patented Nov. 30, 1920.

Application filed June 15, 1920. Serial No. 389,118.

*To all whom it may concern:*

Be it known that I, DANIEL S. KOHL, a citizen of the United States, residing at Jared, in the county of Pend Oreille and State of Washington, have invented new and useful Improvements in Cultivator Mechanism, of which the following is a specification.

This invention relates to improvements in wheeled frames for cultivating and seeding with means for attachment thereto of any such earth treating devices as may be necessary for the work to be performed.

The invention is especially designed for small work such as garden or truck work and has to do with a wheeled frame which is adapted to be horse drawn. In initially working the land for garden, where the rows are close together, it is practically impossible to drive a horse in a straight line and such deviations as the horse does make, are far more pronounced and troublesome in closely spaced garden rows than in the more widely spaced field rows. Thus, if in the initial working or cultivating, the rows are sinuous, then in seeding and other following treatments, the initial sinuosity or irregularity of the rows must be followed notwithstanding the fact that the horse cannot be made to follow such deviations.

Therefore, it is a primary object of this invention to provide a wheeled frame which is not only adapted to be readily shifted to cause the cultivating shovels to travel in a straight line, irrespective of deviations by the horse, thereby making the initial rows as straight as possible, but in the event that the initial rows are not straight, this shifting feature affords the operator means for following whatever deviation there is in the rows during the seeding and other earth treating operations.

While it is not broadly new to provide such a wheeled frame with means whereby the same may be shifted for the purpose set forth, my invention provides a novel form of shifting means whereby not only a quickly responsive shift can be promptly obtained, but whereby the extent of shift is greatly increased. In accordance with my invention, it is not necessary to wait for the ground wheels to actually swerve and then take a new lateral path of travel before the frame can shift the earth working devices, on the contrary, my improved frame can be shifted and the ground wheels will pivot on the ground surface engaged thereby and this shifting movement can be completed before the ground wheels actually reach a changed course of travel. Of course, the subsequent change of travel of the ground wheels increases the lateral swerve of the machine but this pre-shifting adjustment can be made in cases where a short length deviation is required to be traversed and followed, the shift and back to normal being so quickly made that the ground wheels barely have time to materially change their course of travel.

It is a feature of my invention to extend the axles of the wheels forwardly and radially of the centers of said wheels, and to swivel the frame in supported relation of the forwardly reaching or extending axles in such a manner that a very wide and sweeping shift of the frame can be effected by the wheels freely pivoting on the ground.

Other and further features of this invention will be more fully described in accordance with the accompanying drawing and will be more particularly pointed out in and by the appended claims.

In the drawing:—

Like characters of reference designate similar parts throughout the different figures of the drawing.

Figure 1:
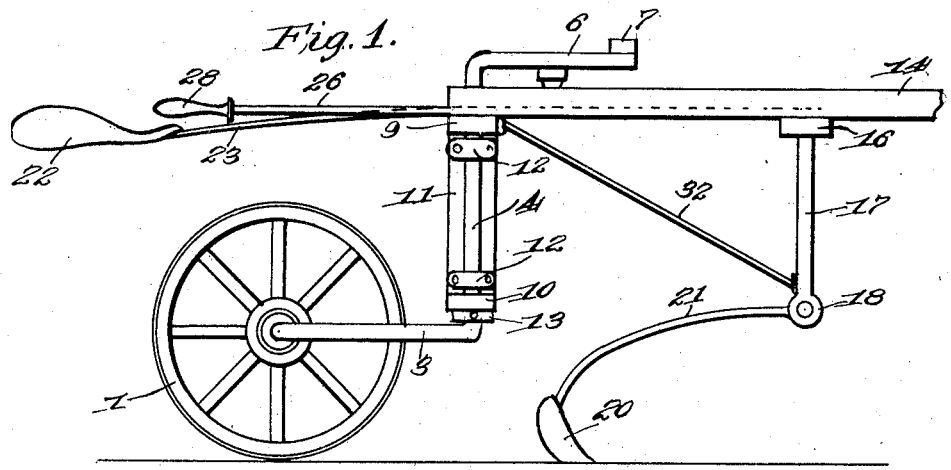
Figure 1, is an end elevation of my mechanism showing earth treating device such as shovels, applied thereto.
Figure 2:
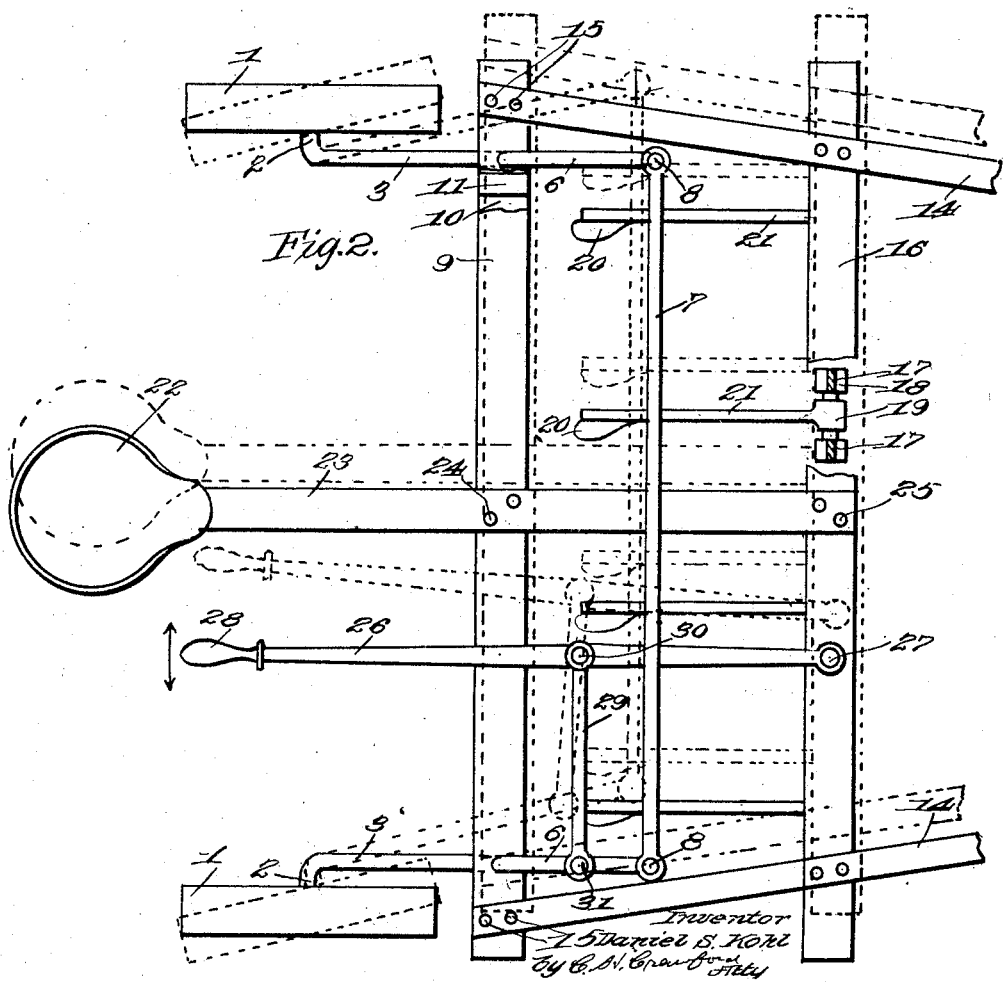
Fig. 2, is a plan view showing in full lines the position of the device when drawn in a straight line of travel, and showing in dotted lines the manner in which the frame may be shifted.

As shown, 1 designates endwise disposed ground wheels which are the frame supporting wheels and which are oppositely arranged near the ends of the frame. Axle means is provided which, as shown, takes the form of axles 2, journaled in the wheels 1, and having forwardly extending sections 3, projecting radially of the wheels to points slightly in excess of the diameters thereof, as shown. Said axles have vertical sections 4, in swiveled and supporting relation to the frame, as will be presently described, whereby the frame will be supported on said axles. Said vertical sections terminate in forwardly projecting steering sections 6 which are link connected by a link 7, pivoted to said sections at 8.

I will next refer to the frame and to the manner in which the frame is shiftably mounted on the axles.

The frame consists as shown of a rectangular frame portion which is rearwardly disposed and which may comprise horizontal upper and lower members 9 and 10, united by vertically disposed members 11. The exact construction of this frame is not material to this invention and may be varied as requirements dictate. I have shown the sections 4, journaled or swiveled through or in this frame portion, said sections extending through the members 9 and 10 along side of the vertical members 11, the latter having bearings 12 through which said sections extend. Collars 13 support the frame on said axles against downward sliding movement. The exact manner in which the frame is swiveled to the axles, to be supported thereby, is not important and may be varied within the limitations of the claims. The important feature is that the frame is supported on the axles, for one thing, and that in addition to being supported on the axles, the frame is swiveled thereon.

I have shown the frame constructed for one horse draft by reason of the fact that this mechanism is especially designed for garden or truck work, and therefore, shafts 14 are secured to the frame at 15, and extend forwardly in converging relation, as shown. Secured to the shafts 14, is a frame member 16, which with the frame portion heretofore described, and the shafts, forms a rigid frame structure. Depending from the frame member 16, are pairs of hangers 17, the lower ends of which form bearings for spindles 18 on which the forward ends 19, are journaled. I have shown cultivating shovels 20, as being attached to the frame, the ends 19 forming the terminals of the beams 21. However, I have referred to these shovels as earth treating devices because the device of my invention is equally adapted for use in connection with seeders or any earth treating implement that might be used in trucking of this character. A driver's seat 22, is mounted on a resilient bar 23 which is secured at 24, to member 9, and at 25, to member 16.

Steering means is provided which will next be described.

As shown, a steering or shifting lever 26, is pivoted at 27, to frame member 16, the handle end 28 being in easy reach of the driver's seat 22. A link 29, is pivoted at 30, to lever 26, and at 31, to the right hand section 6. I have not shown a quadrant lock for the lever 26 as in practice, the lever is almost constantly being used and if desired, any suitable retainer for holding the lever 26 in a straight draft position, may be employed. Braces 32 may be employed to steady the hangers 17, as shown in Fig. 1.

Now it will be clear that if the lever is shifted in either of the directions indicated by the arrow, the ground wheels 1 will pivot about their ground engaging peripheries as shown in dotted lines, the turning thrust on the axles causing the frame to swivel on the vertical sections 4, as the frame shifts laterally. The leverage afforded by the relatively long sections 3 and 6, greatly facilitating this shifting movement. Further, it is because of the relatively great length of the axle sections 3, that such a quick and sweeping shifting movement of the frame can be obtained. This leverage of the axle sections 3, will readily cause the ground wheels to pivot on their supporting areas against such resistance as the ground may offer to such turning movement. The draft on the frame, will normally act to assist in restoring the frame to a normal position after it has been shifted.

Now it will be clear that shifting movement of the frame can occur instantly upon movement of the lever 26, and even if the machine were in a position of rest, by reason of the important fact that shifting movement of the frame need not await lateral movement of the wheels into a new or lateral path of travel.

It is believed that the advantages of my invention will be fully understood from the foregoing description, and while I have shown one form of my invention, I do not wish to be limited thereto except for such limitations as the claims may import.

I claim:—

1. In a cultivator mechanism, a frame having means for attachment thereto of earth treating devices, a seat fixed to said frame oppositely disposed ground wheels, bearing axles journaled in said wheels and having forward sections extending horizontally of the wheels in excess of the diameters thereof, said axles having vertical sections journaled in said frame to support the latter and said vertical sections terminating in forwardly projecting steering sections, a link pivotally uniting said steering sections with each other, and a steering lever pivoted to said frame and in reach from said seat and having link connection with one of said steering sections whereby movement of said lever will laterally shift said frame on said ground wheels as pivots and swivel said frame about said vertical sections to responsively guide said earth treating devices.

2. In a cultivator mechanism, a frame having means for attachment thereto of earth treating devices, a seat fixed to said frame, frame endwise disposed ground wheels, bearing axles journaled in said wheels and having forward sections extending horizontally and radially of said wheels from their centers, said axles having vertical sections journaled in said frame to support the latter and said vertical sections terminating in projecting steering sections, a link pivotally connecting said steering sections with each other, and means in reach from said seat for shifting said steering sections to laterally shift said frame on said ground wheels as pivots and swivel said frame about said vertical sections to responsively guide said earth working devices.

In testimony that I claim the foregoing as my own, I hereby affix my signature.

DANIEL S. KOHL.